United States Patent
Graham

(10) Patent No.: US 10,570,828 B2
(45) Date of Patent: Feb. 25, 2020

(54) GAS TURBINE ENGINE INSTALLED MONITORING AND CONTROL TO PREVENT STANDING WAVE DYNAMIC RESONANCE

(71) Applicant: ElectroMagAccosticEnergy (EMAE) LLC, Fountain Hills, AZ (US)

(72) Inventor: Edward Graham, Fountain Hills, AZ (US)

(73) Assignee: ElectroMagAccousticEnergy (EMAE) LLC, Fountain Hills, AZ (US)

( * ) Notice: Subject to any disclaimer, the term of this patent is extended or adjusted under 35 U.S.C. 154(b) by 0 days.

(21) Appl. No.: 16/301,415

(22) PCT Filed: Jul. 13, 2017

(86) PCT No.: PCT/US2017/042019
§ 371 (c)(1),
(2) Date: Nov. 13, 2018

(87) PCT Pub. No.: WO2018/089057
PCT Pub. Date: May 17, 2018

(65) Prior Publication Data
US 2019/0186383 A1     Jun. 20, 2019

Related U.S. Application Data

(60) Provisional application No. 62/335,982, filed on May 13, 2016.

(51) Int. Cl.
*F02C 9/28* (2006.01)
*F04D 27/02* (2006.01)
*F01D 25/06* (2006.01)
*F02C 9/24* (2006.01)

(52) U.S. Cl.
CPC ............... *F02C 9/28* (2013.01); *F01D 25/06* (2013.01); *F02C 9/24* (2013.01); *F04D 27/0284* (2013.01);
(Continued)

(58) Field of Classification Search
CPC ........ F02C 9/28; F04D 27/0284; F01D 25/06; F01D 2270/301; F01D 2270/303; F01D 2260/80
See application file for complete search history.

(56) References Cited

U.S. PATENT DOCUMENTS 3,971,209 A * 7/1976 de Chair .................. F02C 3/16
                                                    60/787
4,242,864 A     1/1981 Cornett
(Continued)

OTHER PUBLICATIONS

Graham, Ed, Aircraft & Gas Turbine System, Oct. 2015; http://www.academia.edu/19969471/E.Graham_AIAA_Paper_87.
(Continued)

*Primary Examiner* — Dale W Hilgendorf
(74) *Attorney, Agent, or Firm* — Inspired Idea Solutions Law Firm; Wayne Carroll

(57) ABSTRACT

A method of preventing standing waves in an installed gas turbine having a fan, having a fan speed, and a compressor, having a compressor speed, includes correcting the fan and compressor speeds for temperature and monitoring the corrected speeds to prevent them from converging, or becoming the same value. In addition, a computer implemented monitoring and adjusting program may monitor a position of an aircraft on an Acoustic Critical Turbo System Frequency (ACTSF) plot and make adjustments to avoid intercepting a surge line by changing the speed of the plane, one or both of the fan or compressor speeds or by changing altitude. An aircraft may form a standing wave when crossing or oper-
(Continued)

ating on a surge line of an ACTSF plot and this condition should be avoided which may require high data rate monitoring and control logic.

8 Claims, 11 Drawing Sheets

(52) U.S. Cl.
CPC .... *F05D 2260/80* (2013.01); *F05D 2270/301* (2013.01); *F05D 2270/303* (2013.01)

(56) References Cited

U.S. PATENT DOCUMENTS

| | | |
|---|---|---|
| 4,984,425 A | 1/1991 | Smith |
| 5,821,472 A * | 10/1998 | Zwernemann ......... B64D 33/06 181/215 |
| 6,973,193 B1 * | 12/2005 | Tse ........................ F02C 7/045 381/17 |
| 2013/0000314 A1 * | 1/2013 | McCaffrey ............ F01D 13/003 60/773 |
| 2014/0338929 A1 | 11/2014 | Haaland et al. |
| 2015/0152787 A1 | 6/2015 | Topol et al. |

OTHER PUBLICATIONS

Moe, Gary P, et al, Flight Test and Evaluation of Propulsion System Operability Characteristics, American Institute of Aeronautics and Astronauts, 23rd Joint Propulsion Conference, Jun. 29, 1987-Jul. 2, 1987, San Diego, CA.

* cited by examiner

| N2rpm | N1rpm |
|---|---|
| 11998 | 9997 |
| 11999 | 9998 |
| 12000 | 10000 |
| 12001 | 10001 |
| | |
| N2.5C Corrected | N1C Corrected |
| 10798 | 10797 |
| 10798 | 10799 |
| 10800 | 10800 |
| 10800 | 10800 |

FIG. 6

GAS TURBINE ENGINE INSTALLED MONITORING AND CONTROL TO PREVENT STANDING WAVE DYNAMIC RESONANCE

CROSS REFERENCE TO RELATED APPLICATIONS

This application claims the benefit of U.S. provisional application No. 62/335,982 filed on May 13, 2016, the entirety of which is hereby incorporated by reference herein. This application claims the benefit of PCT application no. PCT/US17/42019 filed on 13 Jul. 2017, the entirety of which is hereby incorporated by reference herein.

BACKGROUND OF THE INVENTION

Field of the Invention

The present invention relates to systems and methods for predicting and avoiding the formation of standing waves in a installed gas turbine engines including gas turbine engines installed in aircraft, land vehicles, sea vehicles, and power generators or other applications.

Background

Background is provided for a better understanding of the disclosed subject matter and is not admitted as prior art.

Standing waves formed with a gas turbine engine can create violent shaking of the engine and in some cases, can cause the engine to stall. Violent shaking may be momentary or continuous, but in either case the shaking may be accompanied by a pressure wave that can cause high cycle fatigue (HCF) of engine parts and aircraft parts or other vehicle parts including parts that are anywhere from the cockpit to the tail of the aircraft. In some systems when a standing wave is greater than two pounds per square inch (PSI) high cycle fatigue is caused to components of the system. A gas turbine engine has an inlet (aircraft (AC) inlet) for receiving a flow of air. The air flows through a fan and a portion flows through an outer fan conduit and a portion flows through a core conduit. Pressures formed within the turbine can cause cyclical pressure undulations. Under certain conditions, a standing wave may be formed within the gas turbine which can prevent proper airflow through the ducts and in some cases, can force air out from the air inlet. A standing wave may cause the turbine to shake, sometimes violently and may cause a stall of the turbine. A standing wave may also create combustion instabilities. There exists a need to predict standing wave formation and to prevent them.

A compressor stall is a local disruption of the airflow in a gas turbine or turbocharger compressor. It is related to compressor surge which is a complete disruption of the flow through the compressor. Stalls range in severity from a momentary power drop (occurring so quickly it is barely registered on engine instruments) to a complete loss of compression (surge) necessitating a reduction in the fuel flow to the engine.

Rotating stall is a local disruption of airflow within the compressor which continues to provide compressed air but with reduced effectiveness. Rotating stall arises when a small proportion of airfoils experience airfoil stall disrupting the local airflow without de-stabilizing the compressor. The stalled airfoils create pockets of relatively stagnant air (referred to as stall cells) which, rather than moving in the flow direction, rotate around the circumference of the compressor. The stall cells rotate with the rotor blades but at 50-70% of their speed, affecting subsequent airfoils around the rotor as each encounters the stall cell. Propagation of the instability around the flow path annulus is driven by stall cell blockage causing an incidence spike on the adjacent blade. The adjacent blade stalls as a result of the incidence spike, thus causing stall cell "rotation" around the rotor. Stable local stalls can also occur which are axi-symmetric, covering the complete circumference of the compressor disc but only a portion of its radius, with the remainder of the face of the compressor continuing to pass normal flow.

A rotational stall may be momentary, resulting from an external disturbance, or may be steady as the compressor finds a working equilibrium between stalled and unstalled areas. Local stalls substantially reduce the efficiency of the compressor and increase the structural loads on the airfoils encountering stall cells in the region affected. In many cases however, the compressor airfoils are critically loaded without capacity to absorb the disturbance to normal airflow such that the original stall cells affect neighboring regions and the stalled region rapidly grows to become a complete compressor stall.

Axi-symmetric stall, more commonly known as compressor surge; or pressure surge, is a complete breakdown in compression resulting in a reversal of flow and the violent expulsion of previously compressed air out through the engine intake, due to the compressor's inability to continue working against the already-compressed air behind it. The compressor either experiences conditions which exceed the limit of its pressure rise capabilities or is highly loaded such that it does not have the capacity to absorb a momentary disturbance, creating a rotational stall which can propagate in less than a second to include the entire compressor.

The compressor will recover to normal flow once the engine pressure ratio reduces to a level at which the compressor is capable of sustaining stable airflow. If, however, the conditions that induced the stall remain, the return of stable airflow will reproduce the conditions at the time of surge and the process will repeat. Such a "locked-in" or self-reproducing stall is particularly dangerous, with very high levels of vibration causing accelerated engine wear and possible damage, even the total destruction of the engine. The high levels of vibration may also cause damages to other parts of an aircraft or other system.

A compressor will only pump air in a stable manner up to a certain pressure ratio. Beyond this value the flow will break down and become unstable. This occurs at what is known as the surge line on a compressor map. The complete engine is designed to keep the compressor operating a small distance below the surge pressure ratio on what is known as the operating line on a compressor map. The distance between the two lines is known as the surge margin on a compressor map. Various things can occur during the operation of the engine to lower the surge pressure ratio or raise the operating pressure ratio. When the two coincide there is no longer any surge margin and a compressor stage can stall or the complete compressor can surge.

The industry has not made significant progress on these problems recently for the following reasons: 1) This industry has been targeting "system engineering" and its requirements for the last ten years; however, it has not been able to close the complex loops to avoid the "missing links" in advanced design, development, and production that cause delays, failures, or poor performing end products. 2) In the last thirty years, this industry has been pushing all of the involved technologies as a competitive edge, while again, missing the root of the complex connections needed to have successful system products.

Under certain operating conditions, a turbine engine installation (air, land and sea) can and does experience acoustic resonances, with some similarities to a pipe organ or with blowing across the mouth of a bottle. Actual measurements indicate that this type of resonance can subject an engine/installation system to up to 190 dB of acoustic sound pressure energy, resulting in greatly accelerated engine/inlet damage, reduced performance, engine surge, combustor blowout or inlet instabilities. Due to the systematic nature of the resonance, the resulting failures may appear randomly, anywhere throughout engine/inlet ducts. This gives the appearance of being unrelated or unrepeatable. Levels of over 150 dB have been observed for longer periods of time in outer ducts. This level still exceeds design guidelines and contributes significantly to longer term damage accumulation. These effects of acoustic resonance in turbine engine/inlet installations have been known or suspected for years. Attempts to quantify these effects have been difficult or impossible due to the large number of variables involved in a complex turbine engine/inlet installation. After consolidating over twenty years of research into this phenomenon on a large number of different engine/inlet platforms, there is now documented evidence that the phenomenon is repeatable, and more importantly, predictable and avoidable.

SUMMARY

The disclosure is directed to a method of preventing standing wave formation in an installed gas turbine. The disclosure applies to land, air and sea vehicles, as well as stationary installations for power generation. The discussion, however, primarily relates to aircraft as an example application and for the purposes of illustration and understanding of the disclosure. A standing wave may be formed when the fan speed and compressor speeds, correlated for temperature, converge to the same value. Standing waves may be formed when two incident waves have the same or a resonant frequency with each other, as shown in FIG. 1. An exemplary system to predict and prevent standing wave formation may include one or more temperature sensors and sensors to measure and monitor the speed of the fan and compressor. The compressor speed and fan speed may be correlated for temperature by taking the square root of the fan or compressor speed divided by 288.15K, temperature in Kelvins.

Gas Turbine-Speed/Flow Measurements: To observe internal dynamic duct gas path effects having undesirable flow field disturbances in a gas turbine engine/inlet system, the mass flow instabilities (stalled or reversing) may be measured with high data-rate pressure transducers (above 500 Hz response). In some embodiments, the high data-rate pressure transducers are at least about 300 Hz or higher, such as about 500 Hz or more. High data rates may be required to for proper monitoring and adjustment relative to the ACTSF. Then, the specific flow-path, pressure tapped, calculated locations can be signal processed to identify the fundamental power spectrum density (PSD) frequency of such an acoustic energy-driven disturbance (a modulated 3D standing wave). In conjunction, with this spiralling pressure system development, the rotational frequencies (in Hz) of the compression systems, low pressure-compressor (N1), and high pressure-compressor (N2) may be real-time computed with their respective corrected values of actual rotational speed in RPM divided by the square root of the ratio of actual inlet compression temperatures in degrees Rankine with that of standard sea level temperature (or, $N/\sqrt{\theta}$)). In some embodiments, the standing wave dynamics of Acoustic Critical Turbo System Frequency (ACTSF) includes a relationship to resonance on A/C inlet/engine system. In some embodiments, the frequency of the standing waves are 33.33 Hz. FIG. 4 shows standing waves in the ducts of an aircraft engine. One standing waves is shown in the outer duct, and a second standing wave is shown in the core. Based on test data the standing wave may form first in the outer duct. The standing wave in the core may form after the standing wave in the outer duct, and may have a phase that is 180 degrees from the standing wave in the outer duct. FIG. 3 shows a gas turbine engine having an inlet, and the delta N1 and delta N2 as discussed below. FIG. 4 shows a measured standing wave at the frequency of 33.33 Hz. N1 may be measured at the inlet low pressure fan, and N2 may be measured at the compressor. The N1 (fan) and N2 (compressor) shaft speeds in RPM may match when a standing wave is formed. The formula (N2−N1)−(N2C−N1C)/60=compressor sensor ACTSF, or XX Hz may equal the standing wave stall areas of the power plant's duct and core rotating sections. N1C and N2C are corrected N1 and N2 ACTSF may be 178 dB of Sound Pressure Level (SPL) resonance. This was developed through hundreds of tests where there was a locking relative to corrected N1C−N2C cross-correlations. To be avoided by the RPM miss-matching, switch fuel control to detour any RPM convergence lockup with the corrected speeds. Corrected Speed is the speed a component would rotate at if the inlet temperature corresponded to ambient conditions at Sea Level, on a Standard Day (i.e. 288.15K)

Correlated Speed, $N/\sqrt{\theta}$, can be calculated as follows:

$$N/\sqrt{\theta} = N/\sqrt{T/288.15}$$

Correlated Speed is often abbreviated to Nc or Nr (for Referred Speed).

So-called Non-Dimensional Speed ($N/\sqrt{T}$) is proportional to correlated Speed:

$$N/\sqrt{T} = (N/\sqrt{\theta})/\sqrt{288.15}$$

Nomenclature:
T Stagnation (or Total) Temperature (in Kelvin)
N Real Shaft Speed
θ Referred Temperature When the correlated fan and correlated compressor speed converge or become the same value, it may be more likely that a standing wave will form, especially under other circumstances as detailed herein.

A standing wave is created from two traveling waves. If two sinusoidal waves having the same frequency (wavelength) and the same amplitude are traveling in opposite directions in the same medium then, using net displacement of the medium is the sum of the two waves. As when the two waves are 180° out-of-phase with each other, this system instability as shown in the Bode Plot in FIG. 1 shows gain in sound pressure energy, and when they are in-phase with each other they add together. As the two waves pass through each other, the net result alternates between zero and some maximum amplitude. This pattern may simply oscillate (resonate); it does not travel to the right or the left, but, increases power level between the anti-node and the node pressure values.

Propagation of beats may be from the superposition of two traveling waves of slightly different frequencies. Phase, speed and group speed may all be affected by propagation of beats. Two waves of equal amplitude are traveling in the same direction. The two waves have different frequencies and wavelengths, but they both travel with the same wave speed. As shown in the bode plot of FIG. 2, beats may have higher amplitude and cause damage propagating as acoustic waves.

The formation of a standing wave may be more likely to be formed when a gas turbine is on or crosses an associated surge line at the frequency of an acoustical critical system frequency. A turbo system is described herein, and the acoustical critical system frequency is referred to as an Acoustical Critical Turbo System Frequency (ACTSF). The methods and systems disclosed, however, may be used on turbo systems as well as other systems.

A frequency plot, which may also be called an ATCSF plot, may be generated for a given aircraft or system with a gas turbine engine. The frequency plot plots altitude versus speed of the aircraft in Mach number. A plurality of frequency lines for various frequencies may be plotted. An ATCSF surge line at a frequency that is the ACTSF may be plotted and these points in space, altitude, speed and frequency may be avoided to reduce the likelihood of standing wave formation. It is to be understood that the frequency plot is a continuous map for ACTSF as a function of altitude and speed of the aircraft. For the purposes of illustration, however, avoidance of a point on an ACTSF surge line is described. An exemplary computer implemented monitoring and adjustment program may monitor the altitude and speed and may calculate or monitor a ACTSF frequency for the gas turbine engine. An ACTSF frequency may be the natural frequency of the medium within a finite space, including the medium of air within a duct of an installed gas turbine engine, and the medium of air within the core of an installed gas turbine engine.

Determination of the difference in the temperature correlated compressor speed to the temperature correlated fan speed, in RPM, divided by 60 may provide a frequency in Hertz. The frequency in Hertz may be compared with the ACTSF using an ACTSF surge line on the frequency plot. An exemplary frequency plot includes a projected compressor frequency as a function of altitude and speed of the aircraft, in Mach number. The exemplary computer implemented monitoring and adjustment program may predict an intersect with a point on the ACTSF surge line and may adjust the fuel control of one or more of the aircraft engines or gas turbine engines to avoid converging with the ACTSF surge line, which may be the line for the ACTSF frequency. The computer implemented monitoring and adjustment program may change the flow rate of fuel to the turbine to change the compressor and/or fan speed which will shift the correlated frequency of the fan or compressor, for example by changing an altitude or speed of the aircraft.

The present disclosure relates to systems and methods for monitoring the operational characteristics of gas turbines, and more particularly relates to real time installed monitoring of the operational characteristics of such turbines and their interfaces. Standing waves may form in ducts as illustrated in the drawings as a source of acoustic resonance throughout the vehicle systems and causing a resulting beating on fuselage, which leads to high cycle fatigue (HCF).

A prime generator of acoustic waves in the turbofan's ducts, for example, is the fan rotating at speeds relative to N1/N2 which are translatable into rotational frequencies. Experimentally, it has been shown that resonance occurs when the rotational frequency of the turbofan equals the resonant frequency of the aircraft/engine duct flow stream from inlet of the aircraft to nozzle/duct exits (e.g., for a low bypass turbofan gas turbine engine is installed with the vehicle's inlet, with a characteristic resonant frequency of for example 33.3 Hz for F-16s with a Pratt & Whitney engine). When the anti-node amplitude of a conditioned standing wave (in the duct flow stream) is significant at this resonant frequency, shock fronts form at both fan and compressor discharge points causing pressure surges and compressor discharge pressure is increased to a value that causes the compressor pressure ratio to exceed the surge-line. The standing wave may result in an instantaneous reverse flow in both the fan and core flow streams, which can lead to subsequent engine partial-full surge, along with "glow discharge" phenomena or full ionization for stronger shocks. In the case of a turbofan engine, the fan and compressor discharge pressures may be strongly correlated.

In embodiments of the described and illustrated systems and methods, a gas turbine engine may be improved by controlling dynamic standing waves in system flight and installed ground operations. Embodiments may include systems and methods for monitoring the operational characteristics of gas turbines, and may include real time installed monitoring of the operational characteristics of such turbines and their interfaces.

The following detailed description includes references to the accompanying illustrations which form a part of this detailed description. Example embodiments are described in enough detail to enable those skilled in the art to practice the present subject matter. However, it will be apparent to one of ordinary skill in the art that the present invention may be practiced without some these specific details. In other instances, well-known methods, procedures and components have not been described in detail so as not to unnecessarily obscure aspects of the embodiments. The embodiments can be combined, other embodiments can be utilized or structural and logical changes can be made without departing from the scope of what is defined and claimed. The following detailed description is, therefore, not to be taken as a limiting sense, and the scope is defined by the appended claims and their equivalents which are to be understood in their broadest possible sense.

In this document, the terms "a" or "an" are used, as is common in patent documents, to include one or more than one. Furthermore, the term "or" is used to refer to a nonexclusive "or," such that "A or B" includes "A but not B," "B but not A," and "A and B," unless otherwise indicated. As used in this document A/C means aircraft The foregoing summary is provided as a general introduction to some of the disclosed embodiments, and is not intended to be limiting. Additional example embodiments including variations and alternative configurations are provided herein.

BRIEF DESCRIPTION OF SEVERAL VIEWS THE DRAWINGS

The accompanying drawings are included to provide a further understanding of the invention and are incorporated in and constitute a part of this specification, illustrate embodiments of the invention, and together with the description serve to explain the principles of the invention.

FIG. 6 shows the data for the fan speed, N1, the compressor speed, N2, as well as the temperature correlated fan speed N1C and temperature correlated compressor speed N2.5C.

Figure 1:
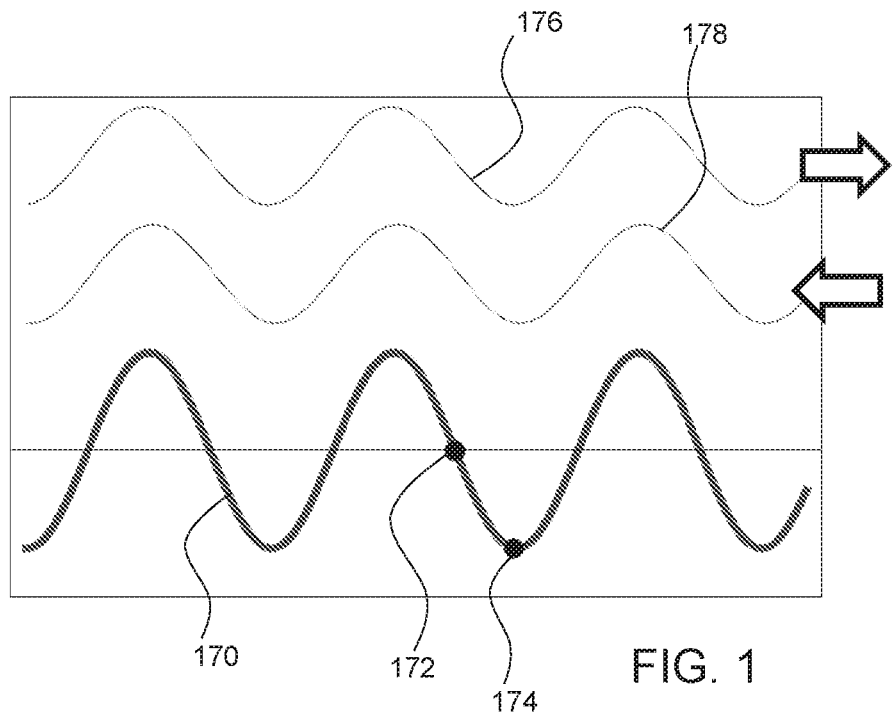
FIG. 1 illustrates a standing wave formed from two waves having resonance.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments are described herein and are illustrated in the accompanying figures. The embodiments described are only for purposes of illustrating the present invention and should not be interpreted as limiting the scope of the invention. Other embodiments, and certain modifications, combinations and improvements of the described embodiments, will occur to those skilled in the art and all such alternate embodiments, combinations, modifications, improvements are within the scope of the present disclosure.

As shown in FIG. 1, two traveling waves, a first wave 176 and a second wave 178, moving in opposite directions and form a standing wave 170.

The standing wave 170 is no longer a travelling wave because the node and antinode do not change position, but continue in the same location repeatedly. The locations of the standing wave 170 with maximum displacement is the antinode 174 and the locations with zero displacement is the node 172.

Figure 2:
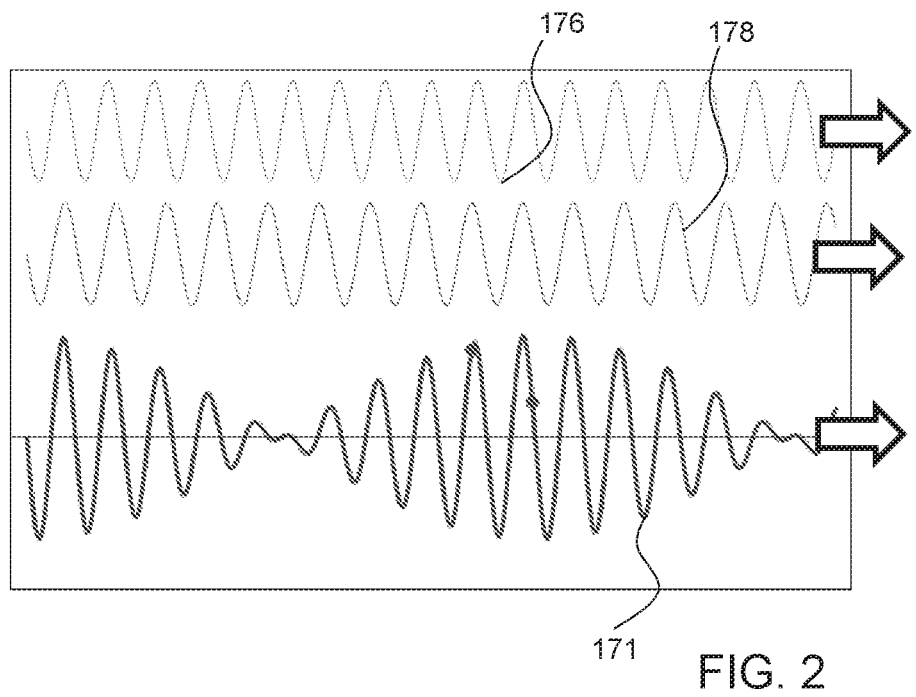
FIG. 2 illustrates the formation of a beat wave from two waves moving in the same direction.

FIG. 2 shows two waves, a first wave 176 and a second wave 178, with slightly different frequencies traveling in the same direction that interact to form a beat wave 171. The resulting beat wave travels in the same direction and with the same speed as the two component waves. The "beat" wave oscillates with the average of the two frequencies, and its amplitude envelope varies according to the difference of the two frequencies. This could be analogous to the difference between the Fundamental Angular Driving Frequency ($\lambda$-$\omega$) and the Fundamental Duct Resonance Frequency ($\lambda$-L)— with a $\pi$ factor. Therefore, we observe engines with driving fundamental frequencies of 16.66 Hz combined with Ducts to produce System Resonance Frequencies of 33.33 Hz, 50.00 Hz, etc. However, these higher Dynamic sound pressure level frequencies are not likely to be identified in "Engine Only" test cells (100% recovery bell-mouth inlets) because the installed system configuration is missing. The resonance is with the installed system, including the engine and when there is no system, there is no forcing function to observe or measure.

Figure 3:
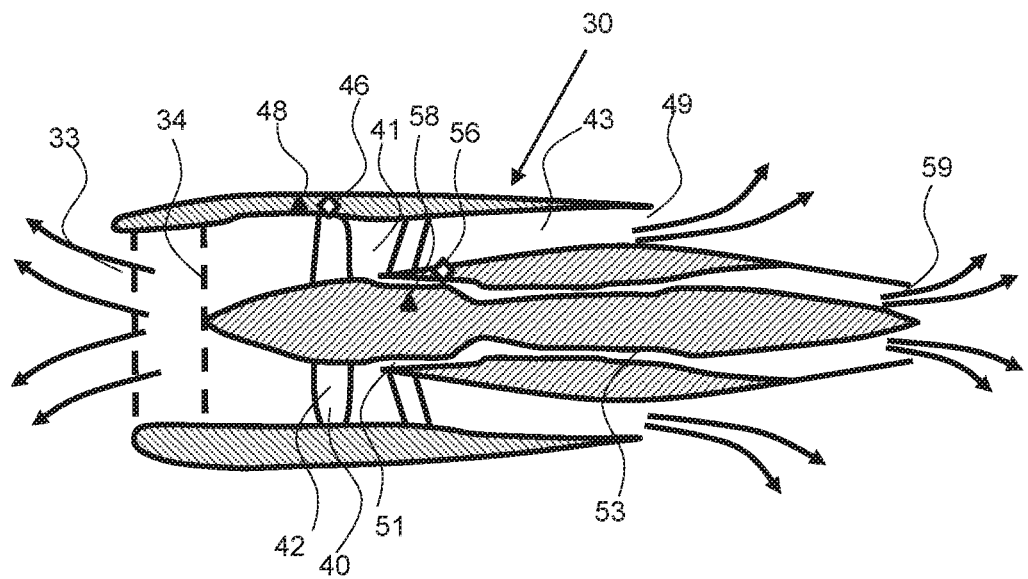
FIG. 3 shows a cross-sectional view of an exemplary gas turbine engine.

As shown in FIG. 3, a gas turbine 30 has a turbine inlet 33 (aircraft (AC) inlet) that delivers a flow of air to a fan duct 43 and a core duct 53 also called a compressor duct. Some of the inlet air flows out through the fan outlet 49 and some flows out through the core outlet 59. The air flows from the turbine inlet into an engine inlet 34, and then through the fan 40. A portion of the air then flows into the fan inlet 41 and into the fan duct 43 and a portion flows into the core inlet 51 and into the core duct 53. An exemplary fan speed sensor 48 measure the speed of the fan and a compressor speed sensor 58 measures the speed of the compressor. An exemplary fan temperature sensor 46 measures a temperature of the fan, or the airflow proximal to the fan 40, such as just upstream of the fan blades 42. A compressor temperature sensor 56 measures a temperature of the compressor, or the airflow proximal to the compressor, such proximal to the compressor inlet or in the compressor duct.

Figure 4:
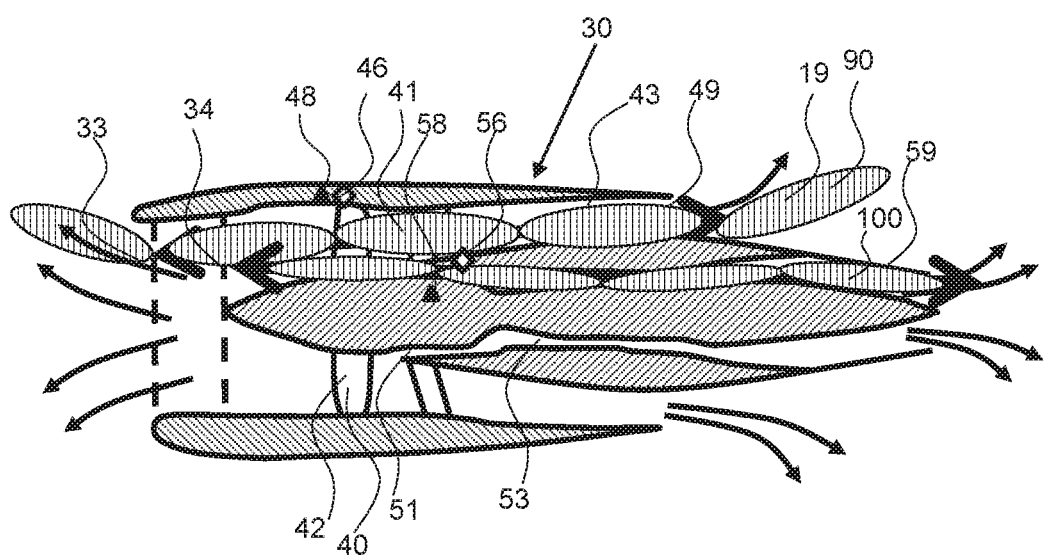
FIG. 4 shows a cross-sectional view of an exemplary gas turbine engine having a fan wave and a core wave traveling through the engine.

As shown in FIG. 4, waves 19, including fan waves 90 and compressor waves 100 are formed by the air flowing through the gas turbine engine 30. Separate waves at the same or different frequencies may be formed as the airflow is directed through the engine and separated into the fan duct 43 and the core duct 53. Air flowing through the fan duct may be the medium for a fan wave, and air flowing through the core duct may be the medium for a core wave. A standing wave may be formed when the frequency of the fan and duct waves are the same or are at a resonate frequency of each other. The standing waves can stall the engine as it can prevent proper airflow through the turbine. The speed of the fan and the speed of the compressor can have an impact on the fan wave frequency and the core wave frequency, respectively. A fan temperature sensor measures a temperature of the air proximal to the fan and a compressor temperature sensor measures a temperature of the air proximal to the compressor. The fan speed and compressor speed, in revolutions per minute, can be correlated for temperature by the equation taking the square root of the measured temperature divided by 288.15 K. If the correlated speeds approach each other, then a standing wave may be formed.

Figure 5:
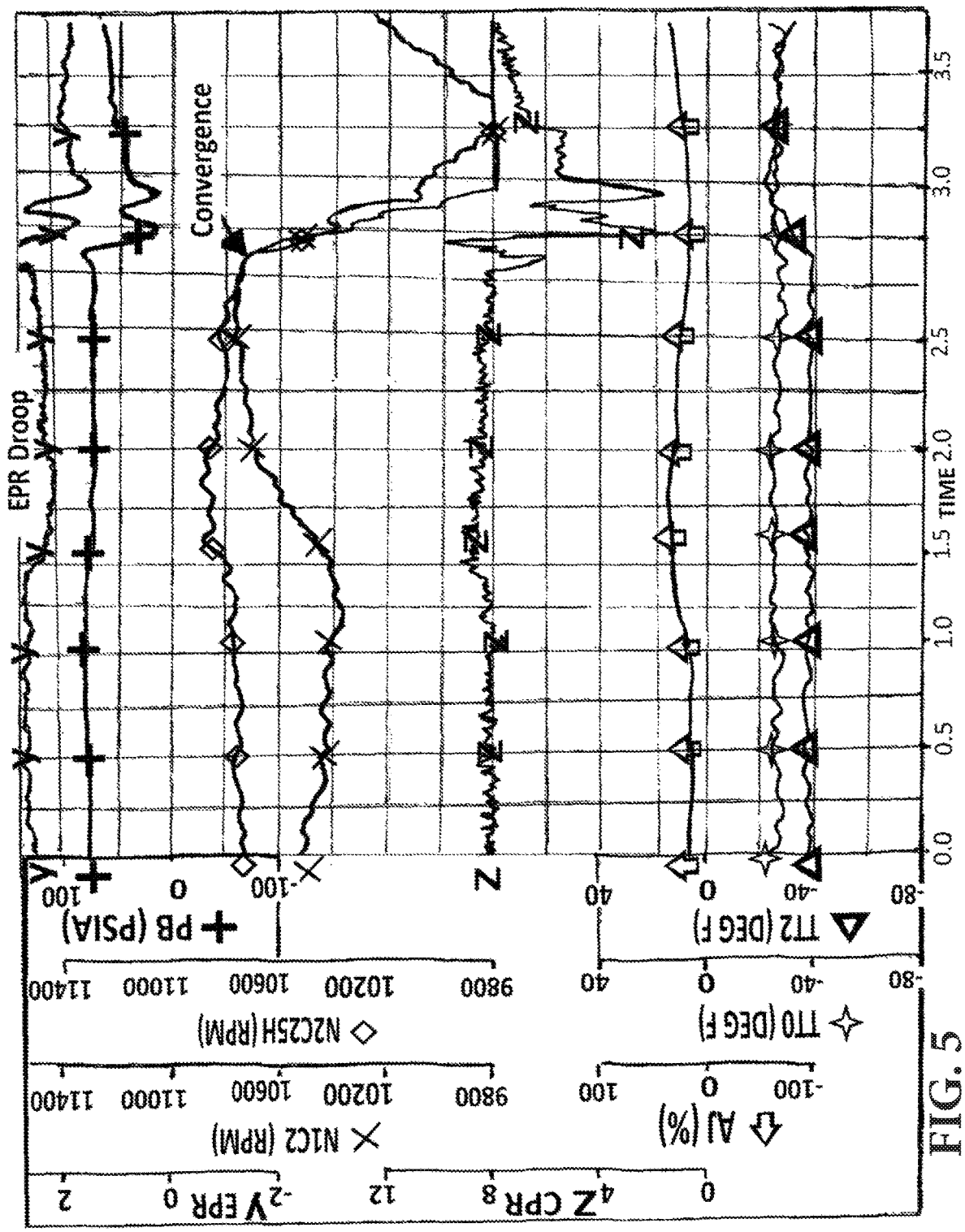
FIG. 5 shows a graph of temperature correlated fan speed and temperature correlated compressor speed converging and causing a standing wave to form.

As shown in FIG. 5, a plot of the correlated speed of the fan and the compressor are shown converging and the turbine stalling as a result. FIG. 6 shows the data table for the correlated speeds of the fan and compressor and when the two correlated speeds converged at 10800 rpm, the engine stalled.

Figure 7:
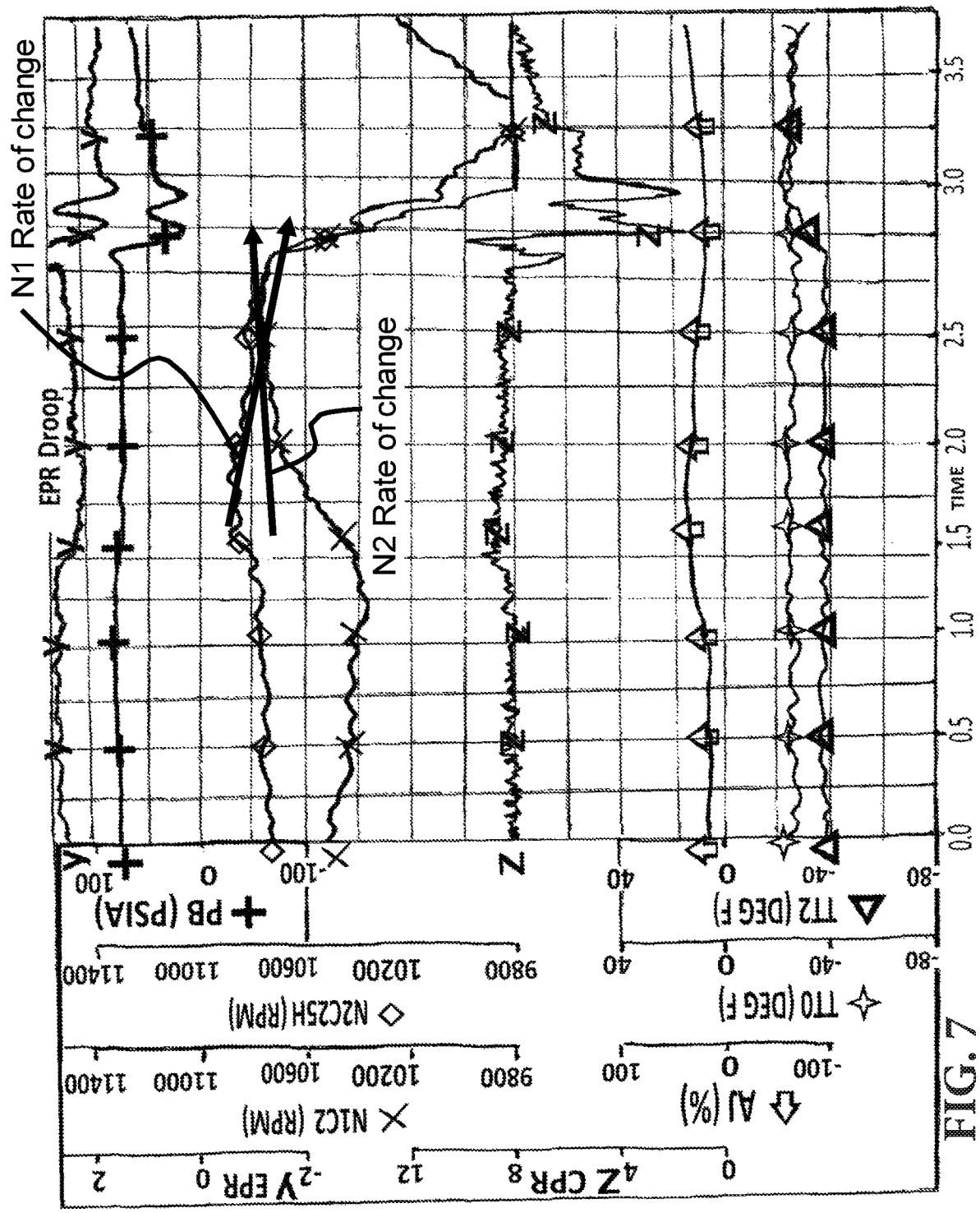
FIG. 7 shows the graph shown in FIG. 5 with the rate of change of the temperature correlated fan speed and temperature correlated compressor speed shown with bold lines.

As shown in FIG. 7, a method as described herein may calculate a rate of change of the correlated fan and correlated compressor speeds and determine if there will be convergence based on these values and the present values of the correlated speeds. If a convergence is predicted, one or both of the fan and compressor speeds may be changed to avoid convergence. The fan speed may be changed relative to the compressor speed by gear ratios or the rate of fuel delivered to the turbine may be changed to change the correlated speeds.

Figure 8:
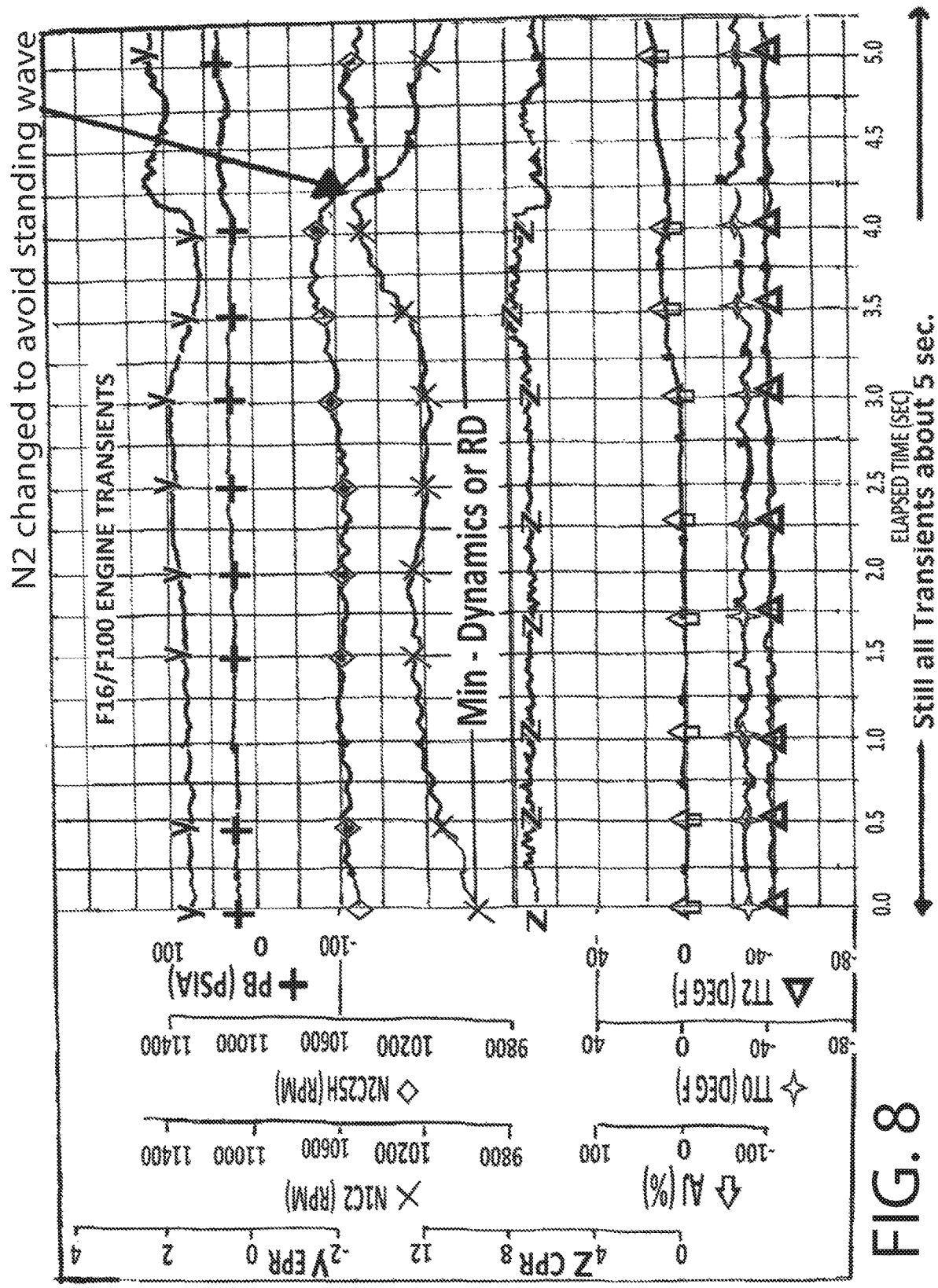
FIG. 8 shows a graph of temperature correlated fan speed and temperature correlated compressor speed converging and then diverging due to a change in a system condition.

As shown in FIG. 8, a convergence was predicted and a control system changed the correlated speeds and avoided a stall of the engine.

Figure 9:
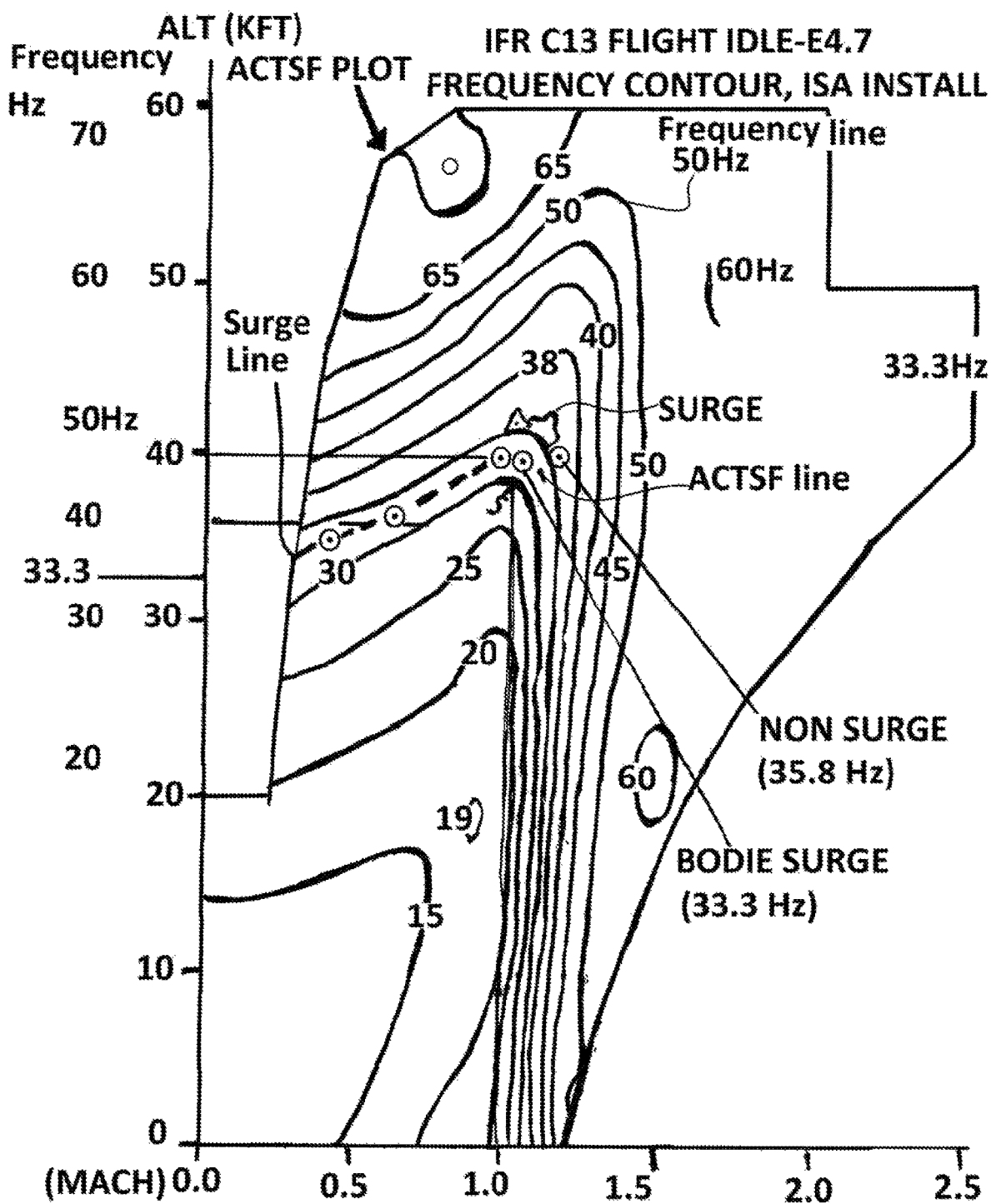
FIG. 9 shows an exemplary flight envelope diagram as a frequency plot having correlated frequency values as a function of altitude and Mach number.

As shown in FIG. 9, a frequency plot is created by plotting the frequency values as a function of altitude and Mach number. A surge line may be plotted based on the frequency of the ACTSF value. The frequency lines for the different frequency values are shown as a function of altitude and Mach number. An aircraft operating at a particular frequency value may avoid an intercept with the ACTSF surge line, or reduce the amount of time at the intercept point with their associated ACTSF surge line, as this may be a condition that forms a standing way. An exemplary standing wave prevention system may include the ACTSF value of the installed gas turbine engine and also monitor the altitude and Mach number and compare the frequency values with the ACTSF surge line on the frequency plot to determine if a current course or change in conditions will create an intercept with the associated ACTSF surge line. If an intercept is predicted, the aircraft may change course by changing altitude or rate of change of altitude, speed or rate of change of speed or Mach number, and/or change the frequency value by changing either the correlated fan speed or correlated compressor speed.

Figure 10:
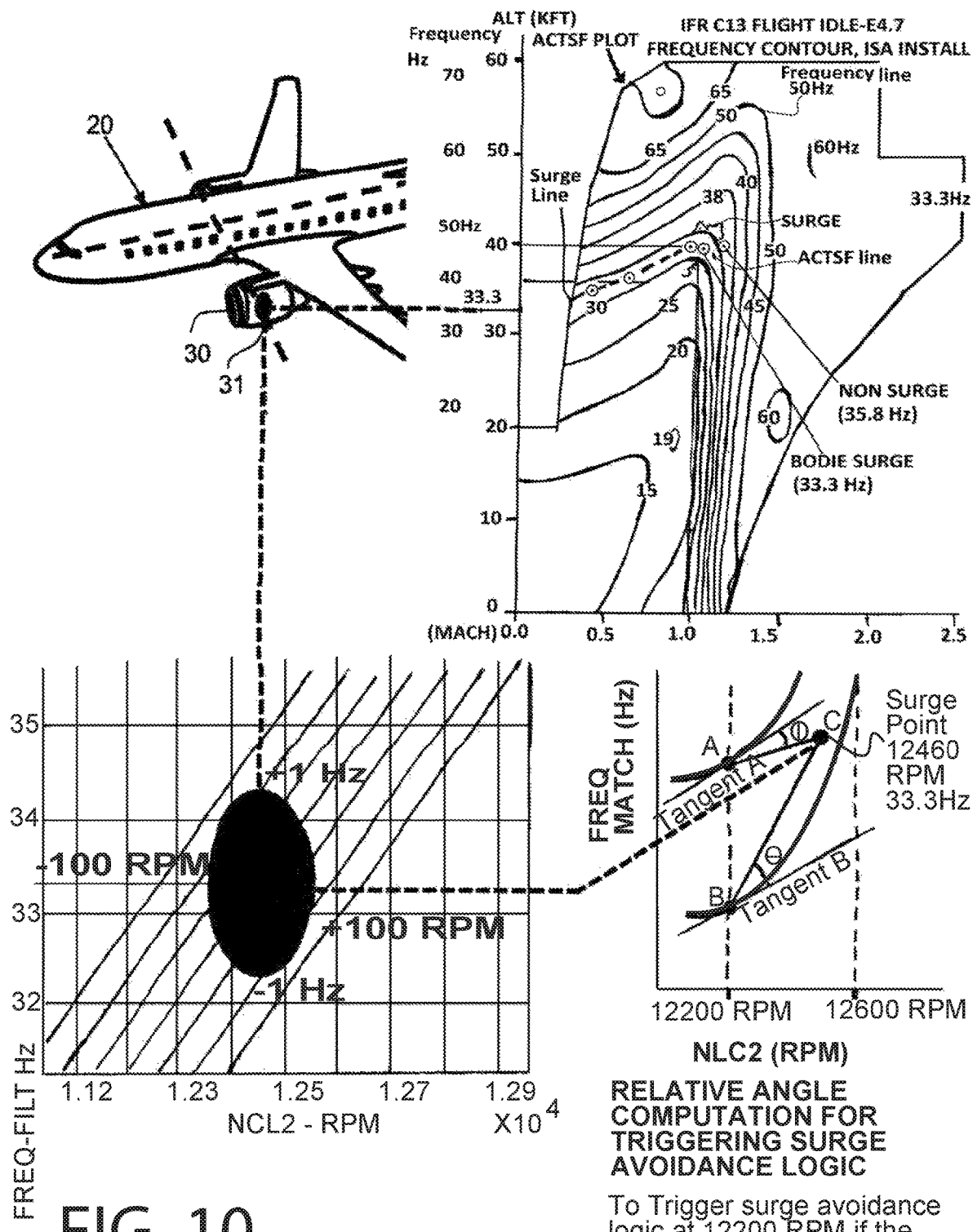
FIG. 10 shows the frequency plot shown in FIG. 9 along with a particular point in space of this plot that is to be avoided, bottom graph with black oval.

FIG. 10 shows the frequency plot shown in FIG. 9 along with a particular point in space of this plot that is to be avoided, bottom graph with black oval. In some embodiments by adjusting the system to avoid the intersection of the ACTSF predicted point by plus or minus one Hertz, and by plus or minus one hundred rotations per minute a standing wave may be avoided.

Figure 11:
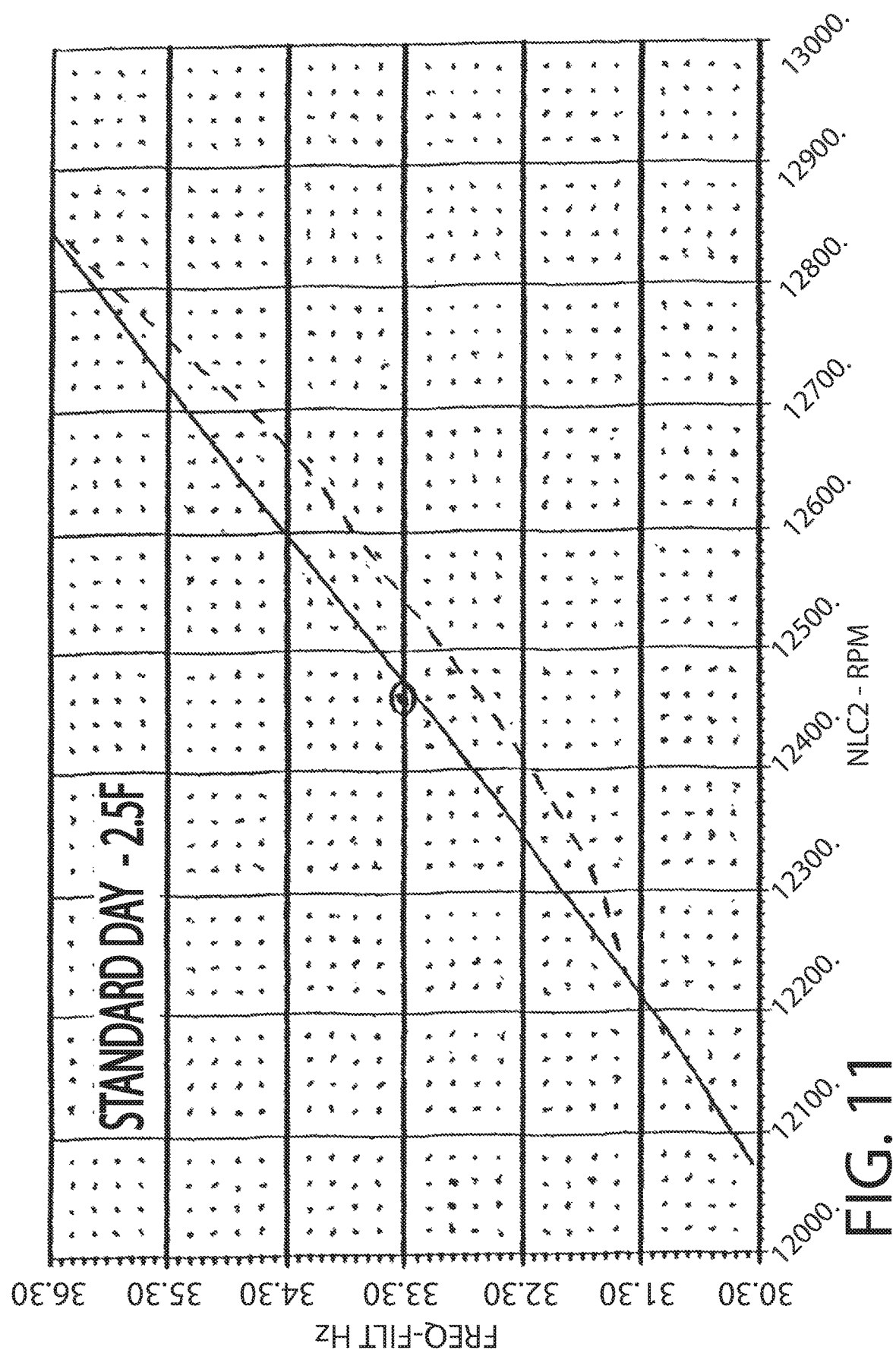
FIG. 11 shows a plot of correlated frequency of a compressor versus correlated speed NLC2 with a solid line showing a projected line that intersects with a point at 33.3 Hz, and a dashed line is a correlated projected line that diverts around the point at 33.3 Hz in space as defined by the frequency plot.

FIG. 11 shows a plot of correlated frequency versus temperature correlated compressor speed NLC2, and a dashed line that diverts around a point in space as defined by the ACTSF.

Figure 12:
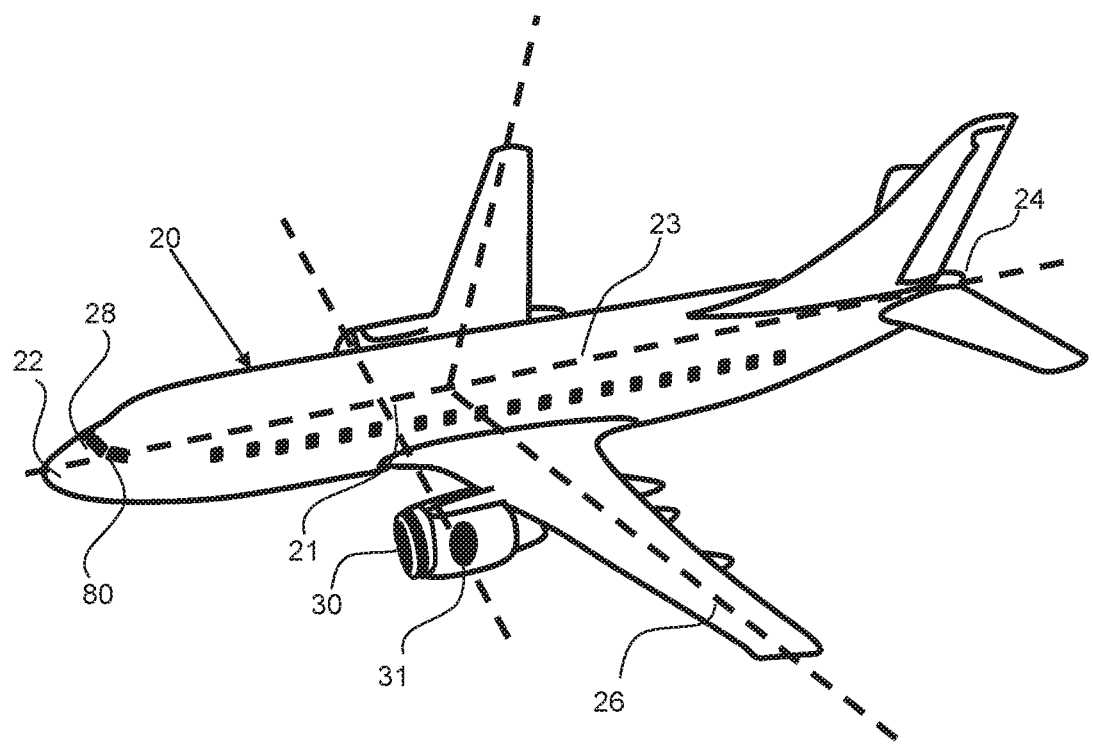
FIG. 12 shows a diagram of an aircraft having a gas turbine engine on either wings and an exemplary computer implemented monitoring and adjustment program installed in the aircraft for preventing standing wave formation in the gas turbine engines.

FIG. 12 shows a diagram of an aircraft 20, an airplane, having a gas turbine engine 30 on either wing 26 and an exemplary computer implemented monitoring and adjustment program 80 installed in the aircraft for preventing standing wave formation in the gas turbine engines. A standing wave may create vibration in gas turbine engine and cause the engine to vibrate, wherein the center of mass 31 of the engine vibrates which in turn can vibrate the wing 26, and the aircraft, such as around the center of mass 21 of the aircraft. The aircraft has a centerline 23 extending from the front 22 to the back 24 of the body of the airplane. The entire airplane may vibrate due to the formation of a standing wave.

Figure 13:
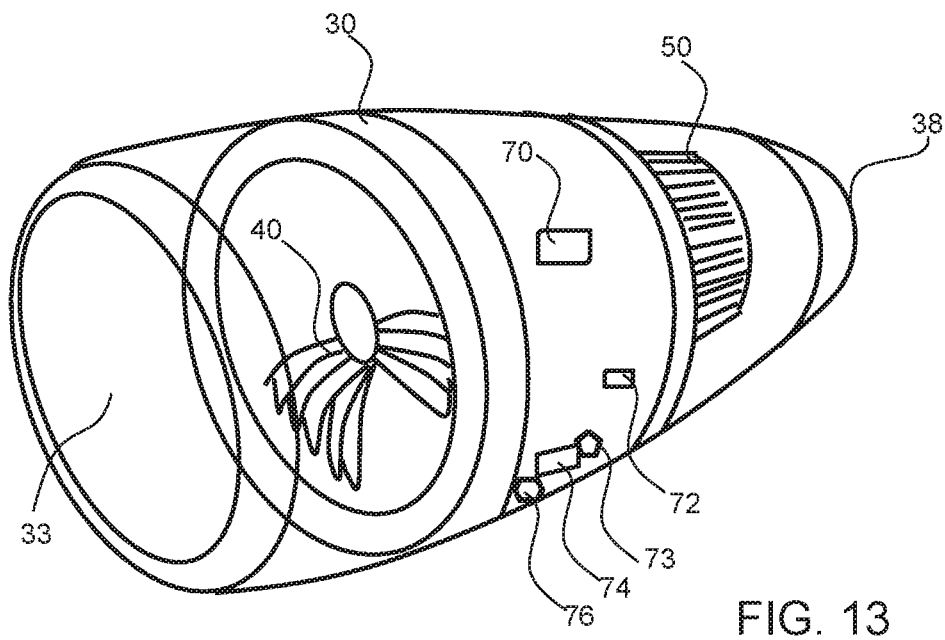
FIG. 13 shows an exemplary gas turbine engine having a controller to adjust engine parameters to avoid standing wave formation.

FIG. 13 shows an exemplary gas turbine engine having an inlet 33 for receiving a flow of air and an outlet 38. The exemplary gas turbine has a fan 40 and a compressor 50. A controller 70, which may include a microprocessor, receives input from the sensors, as described herein, and provides commands to adjust the gas turbine engine to avoid standing wave formation. The controller may change the amount of fuel delivered to the engine and may send commands to change a fuel pump rate to the fuel pump 74 or fuel metering device 76. The controller may also send commands to an engine actuator 72 that can adjust the relative speeds of the fan and compressor, such as by changing gear ratios and the like.

Figure 14:
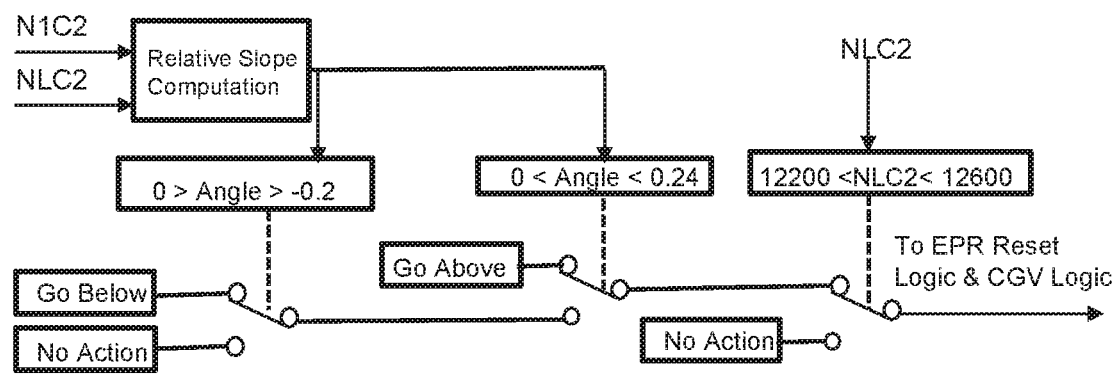
FIG. 14 show a flow chart of a control logic or algorithm to adjust speed to avoid standing wave formation.

FIG. 14 shows example logic where the computer or processor calculates relative slope computation and then determines if the angle is between 0 and −0.2 or between 0 and 0.24. In this example, the N2C speed. If the angle is between 0 and −0.2, then the controls are activated to change the speed to go below the ACTSF surge point. If the angle is between 0 and 0.24 the controls are activated to change the speed to go above the ACTSF surge point. In this example, the ACTSF surge point is calculated between 12,200 and 12,600 of N1C2, so the control logic is only activated to go above or below if N1C2 is between 12,200 and 12,600.

In some embodiments a fuel control unit may accept an input to temporarily adjust the fuel control, a processor may determine that a change is needed for the fuel control and may send a command to the fuel control unit to reduce or increase the fuel for a short period of time called a buzz period. In some embodiments, the buzz period may be between five and twenty-five milliseconds. In some embodiments, and in experimental tests, a command was sent to the fuel control for a ten millisecond pulsing of the fuel to reduce the fuel during a buzz period, also referred to as buzzing the fuel. The temporary reduction of the fuel was shown to change a projected speed in RPM of the fan or the compressor, and thereby prevented the standing wave from forming. The buzz period may be short enough that it will not affect the overall performance of the installed gas turbine, but long enough to effect a change so that the standing wave does not form, and the vehicle avoids the incident point in space with the conditions to form a standing wave. In some embodiments, the conditions for an installed gas turbine allowed for a buzz period of ten to twenty milliseconds as an effective buzz period.

The described systems and methods may be used in multiple types of turbine engines including micro-turbines, and engines not used on aircraft, such as distributed generation systems. In some embodiments the systems may be used in test facilities with installed conditions to test aircraft engines, and verify that the system avoids surge conditions for a particular aircraft. If an aircraft engine is not tested with installed conditions, the resonance of the standing wave with the installed conditions will not be observed.

In an example test, a F-124 was tested in a ground test with results that lead to bodie throttle transient surging. The transient surge was measured from 24 psi to 30 psi and then to 14 psi to recovery cycle over a time of 40 ms=25 Hz as the ACTSF surge in a test engine with installed conditions for a T-45 ground operation. After engine prep for ground testing, a startup to idle was accomplished, then a bodie throttle increase was initiated at approximately 60% N1C and 112 psi. When the transient speeds reached [N2−N1]−[N2C−N1C]=1500/60=25 Hz, then the engine surged and recovered as measured by high response instrumentation. The ambient temperature on all data (2 test days) was 50 degrees F., which was used in the correlated speed numbers.

The frequency for a particular engine and vehicle may be measured with a modal approach. Spectral sweeps may produce data to identify critical frequencies that may be an ACTSF. For example data was obtained where 55.0 Hz was identified as a the ACTSF for the configuration based on spectral sweeps. By measuring spectrum vs. time, high density areas on a plot may reveal frequencies that are likely to be critical frequencies that may be an ACTSF. In an example system a first run of analysis using modal approach showed a value of 0.114 or the highest peak noted. A 54.6 Hz peak was found that may also represent a 150 dB SPL or an average above the 140 dB design level. From algorithm calculation of ACTSF (standing waves in an aircraft–gas turbine ducts) the calculated ACTSF in this example system is 55.0 Hz. Data from a modal analysis was also used to plot frequency vs amplitude. The highest amplitude of 0.134 in the example occurred at the measured frequency of 54.6 Hz. The data from the modal analysis was also used to plot frequency vs amplitude. In this test data frequency was expressed as rotations per minute RPM for the high compressor, and for an intermediate compressor, and for a low compressor. At the measured frequency of approximately 55 Hz the wave or frequency amplitude is about 165 dB which represents a damaging level over time.

The data in the example is from pressure and vibration sensors that feed data to a CPU. A computer with a CPU can graphically present visual dynamic frequency, SPL intensity, and positioning of the various elastic standing waves observed. Other plot methods may show results of identifying 55 Hz as ACTSF with a spectral dynamics acoustic analyzer. Graphs may show inter-related peak values aligning to show that the critical frequency is about 55 Hz.

An example engine type may be installed in two different vehicles with different inlet ducts. The frequency of the standing waves may be different between the two vehicles even though they have the same engine installed. The different frequencies may be due to different lengths of the total engine system from the inlet duct to the exit. The engine may have multiple sensors placed at multiple locations in the engine and inlet duct. Sensors may include microphone sensors, high response pressure sensors, accelerometers, and other sensors. The disclosed control systems may be installed and used with existing engines, aircraft, and systems, and may also be used with systems designed in the future.

In some embodiments an aircraft may already have the existing sensors installed that are needed to predict the standing conditions leading to a standing wave, and implementation of the disclosed systems may include using the disclosed algorithms to determine when conditions are nearing a predicted standing wave, and adjusting engine control systems to avoid the predicted standing wave conditions. In an example embodiment algorithms may be programmed on a slot card that is installed in the vehicle data system to modify the throttle control.

The disclosed algorithms compares compressor speeds for engines with two compressors (fan and compressor). The algorithms may also be used on compressors that have more than two compressors. The compressor speeds of the first and second compressor may still be predominate factors in the forming of a standing wave, and a standing wave may form when the third compressor has a corrected speed that matches with one of the other compressors.

In some embodiments a modal analyzer is used with sensors including pressure sensors, accelerometer, microphone that can measure 180 dB, and rapid compressor face temperature sensors. This example models the radiation of fan noise from the annular duct of a turbofan aero-engine. When the jet stream exits the duct, a vortex sheet appears along the extension of the duct wall due to the surrounding air moving at a lower speed. The near field on both sides of the vortex sheet is calculated.

The Aero-acoustics modeling interface in the Acoustics Module describes acoustic waves in a moving fluid. However, the field equation is only valid when the velocity field is irrotational, a condition that is not satisfied across a vortex sheet. As a consequence, the velocity potential is discontinuous across this sheet and to model this discontinuity, you use assemblies that are connected through coupling pairs. The system may be modeled with a modeling and simulation software such as COMSOL brand modeling software.

Data from a study by the inventor where (500 Samples/Sec) digital signal processing (DSP) of transducers on engine stall and pre-stall flight transient data were used to define the axial, radial, and circumferential transducer sensed perturbations. The use of selective band passed DSP cross-correlation techniques identified the frequency-energy, phase-magnitude content relative to mapping the dynamics within the engine's flow field. Input and output compressor data transfer functions were implemented on selected flow-path transducer data showing the specific phase change, gain and power spectrum frequency at the engine's compressor stall point. The use of selective band passed DSP cross-correlation techniques identified the frequency-energy, phase-magnitude content relative to mapping the dynamics within the engine's flow field.

The inventor employed a second approach using high rate data acquisition to identify a relationship between the engine's high compressor physical rotational speed, and that of the corrected thermodynamic speed. These values were then related to those of the fan's physical rotation speed and thermodynamic speed. It was noted, with significant flight test data, that a specifically associated speed value pattern would develop as the engine approached stall-instability.

With more than 400 cases tested, with high rate instrumentation (above 500 samples per second), the power throttle transient leading to a compressor-stalled condition demonstrated this combined speed relationship. Therefore, a special algorithm was conceived by the inventor to associate these rotational speeds and thermodynamic speed matrices with an absolute net repeatable frequency at initiation of surge.

The rotational frequency relationship was found to be a synchronous one, and was found to be repeatable. The gas path internally generated power spectrum density (PSD) frequency and the frequency of the aero-acoustic disturbance were identical in value. This acoustic mode, when established, appears to produce an internal duct flow distortion (partial stall flow field) spiralling throughout the engine causing blade damage, duct stall and combustion instabilities.

Signal processed test data showed that no time delay is observed between these inlet and exit transducers in the development of the "Acoustic Critical Turbo System Frequency" (ACTSF) at engine stall. Normally, a traveling wave would take 7 milliseconds to traverse the distance between inlet and outlet on this test engine. So, the establishment of a standing wave can be considered in order to explain this measured phenomenon. This open-ended standing wave resonance of acoustic patterns showed and explained the relationship of the turbo rotating machinery, acting as a "beat" oscillator (pressure anti-node/node relationship), and the aircraft/engine ducts' cylindrical area volume containing a complex 3-D of standing waves.

Aircraft/engine duct pressure transducers (located at pressure anti-nodes) showed perturbations as high as 8 psi peak-to-peak or 190 dB prior to a violent compression engine stall. Further investigations revealed test data with ACTSF correlations at even lower decibel (150-160 dB) values for longer durations. These lower level random diffused wave-wakes (2-10) may significantly impair engine instrumentation and performance with reduced pressure/temperature values. For many gas turbine engine operations, any energy levels above 140 dB may be considered to be structurally detrimental especially when harmonic excitation can be sustained. These dynamic/random-transmitted energies interject modes of instability throughout the power plant and lead to unbalanced conditions via the imposed shaft(s) irregular flexural frequencies. As a result, there has been a need for an efficient, reliable monitoring system that is capable of providing real time indications of the operational characteristics for the gas turbine engine and aircraft, which may include an acoustic health and usage management system (Acoustic HUMS) that may manage control of the engine to avoid acoustic standing waves.

Some embodiments overcome limitations of the prior art and may provide a reliable system for monitoring the operation and performance of aircraft-gas turbines in their normal operating environment. The system may include an apparatus for sensing a representative portion of the flow gases of the gas turbine. These gases may be sensed through monitoring ports, which permits the anti-node of the standing wave(s) generated to be sampled with all of its standing wave characteristics.

In some embodiments the field is measured with high data-rate pressure transducers. For example, pressure transducers with a data sampling rate of 500 samples per second or higher. A high data-rate pressure transducer may allow the system to fully observe internal dynamic gas path effects having undesirable flow. The specific flow-path, pressure tapped, calculated locations may be signal processed to identify the fundamental power spectrum density frequency of such an acoustic energy-driven disturbance (within a modulated 3D standing-wave). In conjunction with this spiraling-pressure of the low-pressure-compressor (N1), and high pressure-compressor (N2) may be real-time computed with their respective corrected values of actual rotational speed in RPM divided by the square root of the ratio of actual inlet compression temperatures in degrees Rankine with that of standard sea level temperature (or, $N/\sqrt{\theta}$). When these high rate traces are plotted with respect to time, the subsequent plots may show a coupled relationship at certain critical operating rotational speeds (frequencies, RPM/60 Hz). Expansion of this corrected ($N/\sqrt{\theta}$) speed relationship may define the correlation of the fan's rotating stall cell(s) with that of the axial surging of the engine's compression/expansion system.

In some embodiments a method of preventing standing waves may be used in an installed gas turbine engine 30 having a compressor 50 and a compressor temperature sensor 56 in a compressor duct 53, a compressor speed sensor 58, a processor 73, a non-transitory memory, and a fuel control 70, the installed gas turbine engine having an acoustical critical turbo system frequency (ACTSF). The method may include receiving, by the processor 73, a current compressor speed from the compressor speed sensor 58 and storing the current compressor speed as a stored compressor speed. The method may include receiving, by the processor 73, a current compressor temperature from the compressor temperature sensor 56, determining in real time by the processor, a correlated compressor speed based at least in part on the current compressor speed and the current compressor temperature, and determining in real time by the processor 73, a current compressor frequency based on the correlated compressor speed.

The method may also include determining in real time by the processor 73, a projected compressor frequency based at least in part on the stored compressor speed, and determining in real time by the processor 73, a projected convergence of the projected compressor frequency and the ACTSF to determine the projected convergence of the projected compressor frequency and the ACTSF. The method may send a command to the fuel control 70, by the processor 73, to change the current compressor 50 speed to prevent the projected convergence, thereby preventing the standing waves.

In some embodiments the method of preventing standing waves is used in a system with a fan 40 and a fan temperature sensor 46 in a fan duct 43, and a fan speed sensor 48. The method may include receiving, by the processor 73, a current fan speed from the fan speed sensor 48 and storing the current fan speed as a stored fan speed, receiving, by the processor 73, a current fan temperature from the fan temperature sensor 46 and determining in real time by the processor 73, a correlated fan speed based at least in part on the current fan speed and the current fan temperature. The method may include determining in real time by the processor 73, a current fan frequency based on the correlated fan speed, and storing the current fan frequency in memory as a stored fan frequency, and determining in real time by the processor 73, a projected fan frequency based at least in part on the stored fan speed.

Determining the projected convergence may include comparing the projected fan frequency to the projected compressor frequency and the ACTSF. The projected convergence may include convergence of the projected fan frequency with the projected compressor frequency and the ACTSF.

Determining the projected convergence may include determining a current compressor speed rate of change. Determining the projected convergence may include determining a current compressor frequency rate of change and determining a current fan frequency rate of change.

It will be apparent to those skilled in the art that various modifications, combinations and variations can be made in the present invention. Specific embodiments, features and elements described herein may be modified, and/or combined in any suitable manner Thus, it is intended that the present invention cover the modifications, combinations and variations of this invention provided they come within the scope of the appended claims and their equivalents.

What is claimed is:

1. A method of preventing standing waves in an installed gas turbine comprising the steps of:
providing a vehicle having a gas turbine;
wherein the gas turbine comprises a fan having a fan speed and a compressor having a compressor speed;
providing a fan sensor to measure the fan speed and a compressor sensor to measure the compressor speed;

providing a fan temperature sensor for measuring a fan temperature and a compressor temperature sensor for measuring a compressor temperature;

providing a computer implemented monitoring and adjustment program that is executed by a processor;

inputting the fan speed, the fan temperature, the compressor speed and the compressor temperature into the computer implemented monitoring and adjustment program;

calculating a correlated fan speed and a correlated compressor speed, wherein the calculating of the correlated fan speed and the correlated compressor speed includes adjusting the fan speed for the fan temperature and adjusting the compressor speed for the compressor temperature;

calculating an acoustical critical turbo system frequency (ACTSF)

value that is a resonate frequency of at least a portion of the installed gas turbine;

creating an ACTSF plot having a plurality of points along an ACTSF line thereon;

determining a current altitude of said vehicle and a current speed value of said compressor;

determining an altitude rate of change and a compressor speed rate of change;

determining an intersect with at least one of the plurality of points on the ACTSF line corresponding to the ACTSF plot;

wherein the ACTSF plot comprises an altitude ordinate and a speed abscissa with the ACTSF line; and avoiding an intercept with the ACTSF line by changing one of the altitude rate of change, the compressor speed rate of change, the correlated fan speed, or the correlated compressor speed, thereby prevent standing waves in the gas turbine.

2. The method of preventing standing waves of claim 1, wherein the altitude rate of change is changed to prevent the intercept with the ACTSF line on the ACTSF plot.

3. The method of preventing standing waves of claim 1, wherein the compressor speed rate of change is changed to prevent the intercept with the ACTSF line on the ACTSF plot.

4. The method of preventing standing waves of claim 1, further comprising: determining a correlated fan speed rate of change, wherein the correlated fan speed rate of change is changed to prevent the intercept with the ACTSF line on the ACTSF plot.

5. The method of preventing standing waves of claim 1, further comprising: determining a correlated compressor speed rate of change, wherein the correlated compressor speed rate of change is changed to prevent the intercept with the ACTSF line on the ACTSF plot.

6. The method of preventing standing waves of claim 1, wherein a rate of fuel delivered to the gas turbine is increased for a buzz period that is between 5 and 25 milliseconds.

7. The method of preventing standing waves of claim 1, wherein a rate of fuel delivered to the gas turbine is decreased for a buzz period that is between 5 and 25 milliseconds.

8. The method of preventing standing waves of claim 1 further comprising:

providing a fuel sensor to measure a fuel flow of fuel;

adjusting the fuel flow;

predicting a predicted point in space predicted where an ACTSF point and projected convergence are predicted to occur, and where the adjusting the fuel flow includes adjusting the fuel flow to avoid the vehicle from passing through the predicted point in space.

* * * * *